(12) United States Patent
McMillan et al.

(10) Patent No.: US 7,780,309 B2
(45) Date of Patent: Aug. 24, 2010

(54) PREPAREDNESS FLASHLIGHT

(75) Inventors: Peter McMillan, Wollstonecraft (AU); Michael S. Squires, Ryde (AU); David A. Spartano, Brunswick, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 427 days.

(21) Appl. No.: 11/843,921

(22) Filed: Aug. 23, 2007

(65) Prior Publication Data

US 2008/0304258 A1      Dec. 11, 2008

Related U.S. Application Data

(60) Provisional application No. 60/942,044, filed on Jun. 5, 2007.

(51) Int. Cl.
*F21L 4/04* (2006.01)
(52) U.S. Cl. .................. 362/202; 362/208; 362/640; 362/458
(58) Field of Classification Search ............ 362/202, 362/208, 640, 458; 429/96–100, 9; 361/728
See application file for complete search history.

(56) References Cited

U.S. PATENT DOCUMENTS

| | | | |
|---|---|---|---|
| 1,513,437 A | 10/1924 | Voorhees | |
| 1,598,666 A | 9/1926 | Voorhees | |
| 2,752,441 A | 6/1956 | Frank | |
| 3,345,489 A | 10/1967 | Kemnitz | |
| 3,652,846 A | 3/1972 | Starck, II | |
| 3,711,699 A | 1/1973 | Bacevius | |
| 3,743,915 A | 7/1973 | Struck | |
| 3,859,140 A * | 1/1975 | Schmidt | 429/99 |
| 4,000,403 A | 12/1976 | Rice | |
| 4,025,743 A | 5/1977 | Oswald | |
| 4,250,446 A | 2/1981 | Ponte | |
| 4,431,717 A | 2/1984 | Kikuchi | |
| 4,504,889 A | 3/1985 | Goldfarb | |
| 4,607,207 A | 8/1986 | Bruneau | |
| 4,864,474 A | 9/1989 | Maglica | |
| 4,905,129 A | 2/1990 | Sharrah | |
| 5,124,898 A | 6/1992 | Chabria | |
| 5,167,447 A | 12/1992 | Gonzales | |

(Continued)

FOREIGN PATENT DOCUMENTS

DE        1736669        12/1956

(Continued)

OTHER PUBLICATIONS

U.S. Department of Homeland Security, 30 Tips for Emergency Preparedness, Sep. 18, 2006, 11 sheets, http://www.dhs.gov/xcitizens/editorial_0711.shtm.

(Continued)

*Primary Examiner*—Sharon E Payne
(74) *Attorney, Agent, or Firm*—Gregory J. Adams

(57) ABSTRACT

A battery powered electrical appliance (100) operates using batteries (406, 408) of more than one size and provides preparedness information (120) which may be used to assist in preparing for an emergency or otherwise obtaining desired supplies. The electrical appliance (100) may be employed to provide a first task illumination function, at least a first visible signaling function, and an audible signaling function.

26 Claims, 13 Drawing Sheets

U.S. PATENT DOCUMENTS

| | | |
|---|---|---|
| 5,299,375 A | 4/1994 | Thummel et al. |
| 5,471,777 A | 12/1995 | McDonald |
| 5,590,951 A | 1/1997 | Matthews |
| 5,629,105 A | 5/1997 | Matthews |
| 5,644,294 A | 7/1997 | Ness |
| 5,816,688 A | 10/1998 | Shui-Shang |
| 5,909,062 A | 6/1999 | Krietzman |
| 6,046,572 A | 4/2000 | Matthews et al. |
| 6,222,138 B1 | 4/2001 | Matthews et al. |
| 6,276,088 B1 | 8/2001 | Matthews et al. |
| 6,378,237 B1 | 4/2002 | Matthews et al. |
| 6,536,912 B2 * | 3/2003 | Parker ................. 362/206 |
| D496,482 S | 9/2004 | Osiecki et al. |
| 6,942,359 B2 | 9/2005 | Furth et al. |
| 6,968,070 B1 * | 11/2005 | Chiang ................. 381/361 |
| 7,025,471 B2 | 4/2006 | Gorrie et al. |
| 7,514,172 B2 * | 4/2009 | Furth et al. ............ 429/97 |
| 2007/0172724 A1 | 7/2007 | Furth et al. |

FOREIGN PATENT DOCUMENTS

| | | |
|---|---|---|
| DE | 146135 A1 | 1/1981 |
| DE | 10004220 A1 | 8/2001 |
| FR | 2499319 A1 | 8/1982 |
| GB | 2269475 A | 2/1994 |
| JP | 03-257701 A | 11/1991 |
| JP | 09082295 A | 3/1997 |
| JP | 12-040402 A | 2/2000 |
| JP | 19-005113 A | 1/2007 |
| WO | 2005/010429 A | 2/2005 |

OTHER PUBLICATIONS

Patent Cooperation Treaty (PCT), International Search Report and Written Opinion for Application No. PCT/US2008/006985, filed Jun. 3, 2008, mailed Oct. 23, 2008, Korean Intellectual Property Office, Korea.

* cited by examiner

PREPAREDNESS FLASHLIGHT

The present application claims the benefit of U.S. Provisional Application No. 60/942,044, filed Jun. 5, 2007.

BACKGROUND

The following relates to flashlights and other battery powered devices.

Natural disasters and other emergencies can strike at any time, often without warning. While it may be difficult to predict an emergency, it is possible to plan and prepare for one.

One aspect of a family or group emergency preparedness plan includes proper coordination among the various members of the group. Thus, families and other groups have been encouraged to develop pre-defined evacuation plans, communications and contact information, and rendezvous locations to be used in the event of an emergency.

Another aspect of an emergency preparedness plan has been the provisioning of necessary supplies. Depending on the particular situation, the basics of an emergency supply kit typically include water, food, a battery powered radio and flashlight with extra batteries, first aid supplies, a change of clothing, a blanket or sleeping bag, personal sanitation items, a whistle, and the like.

While these and other steps can help meet the challenges posed by an emergency, proper planning and provisioning can sometimes take a back seat to the more immediate concerns of day-to-day life. Moreover, events can overtake even the best laid plans.

As noted above, basic elements of an emergency supply kit include a battery powered radio and a flashlight with extra batteries. In many cases, however, radios and flashlights require different battery sizes. This can complicate the planning process, and the need to provision the required batteries can be overlooked among the numerous imperatives of a preparedness plan. Even where the supply kit includes the appropriate extra batteries, it may be difficult to obtain replacements should they become discharged over the course of an emergency. Indeed, this issue can also arise in non-emergency situations, especially where batteries of the required size are not ready to hand when needed.

A flashlight that can operate with alternative size batteries is described in U.S. Pat. No. 6,942,359 to Furth, et al. issued Sep. 13, 2005. Nonetheless, there remains room for improvement. For example, it remains desirable to provide an improved flashlight or other electrical appliance that accepts different size batteries.

SUMMARY

Aspects of the present invention address these matters, and others.

According to a first aspect, a battery powered device includes a battery tray and a first battery contact support. The battery tray is movable in a movement direction to a position that provides access to the battery tray and to a device operating position. The first battery contact support is movably attached to the battery tray for movement in the first direction and includes opposed first and second sides. The device also includes a first battery contact located on the first side of the battery contact support and that makes electrical contact with a first terminal of a first battery received by the battery tray. The device also includes a first battery contact located on the second side of the battery contact support and that makes electrical contact with a first terminal of a second battery received by the battery tray. The device also includes a first battery contact that makes electrical contact with a second terminal of the first battery and a battery contact that makes electrical contact with a second terminal of the second battery.

According to another aspect, a method of using a battery powered device including a battery tray and a battery contact support is provided. The battery tray receives a first battery of at least first and second battery sizes and a second battery of at least first and second battery sizes for powering the device. The batteries include first and second battery terminals located at opposite ends of the batteries. The method includes placing a first battery in the battery tray. The first battery is placed on a first side of the battery contact support. The method also includes moving the battery contact support toward the first battery and placing a second battery in the battery tray. The second battery is placed on a second side of the battery contact support. The method also includes using a battery contact located on the first side of the contact support to make an electrical contact with the first terminal of the first battery, using a battery contact located on the second side of the battery contact support to make an electrical contact with a first terminal of the second battery, using a battery contact to make an electrical contact with the second terminal of the first battery, and using a battery contact to make an electrical contact with the second terminal of the second battery, and operating the device.

According to another aspect, a battery powered flashlight includes a battery receiving region that receives batteries of at least first and second battery sizes to power the flashlight. The flashlight also includes at least one of a prompt that prompts a user to provide emergency contact information and a prompt that prompts the user to obtain supplies for use in an emergency.

Those skilled in the art will recognize still other aspects of the present invention upon reading and understanding the attached description.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
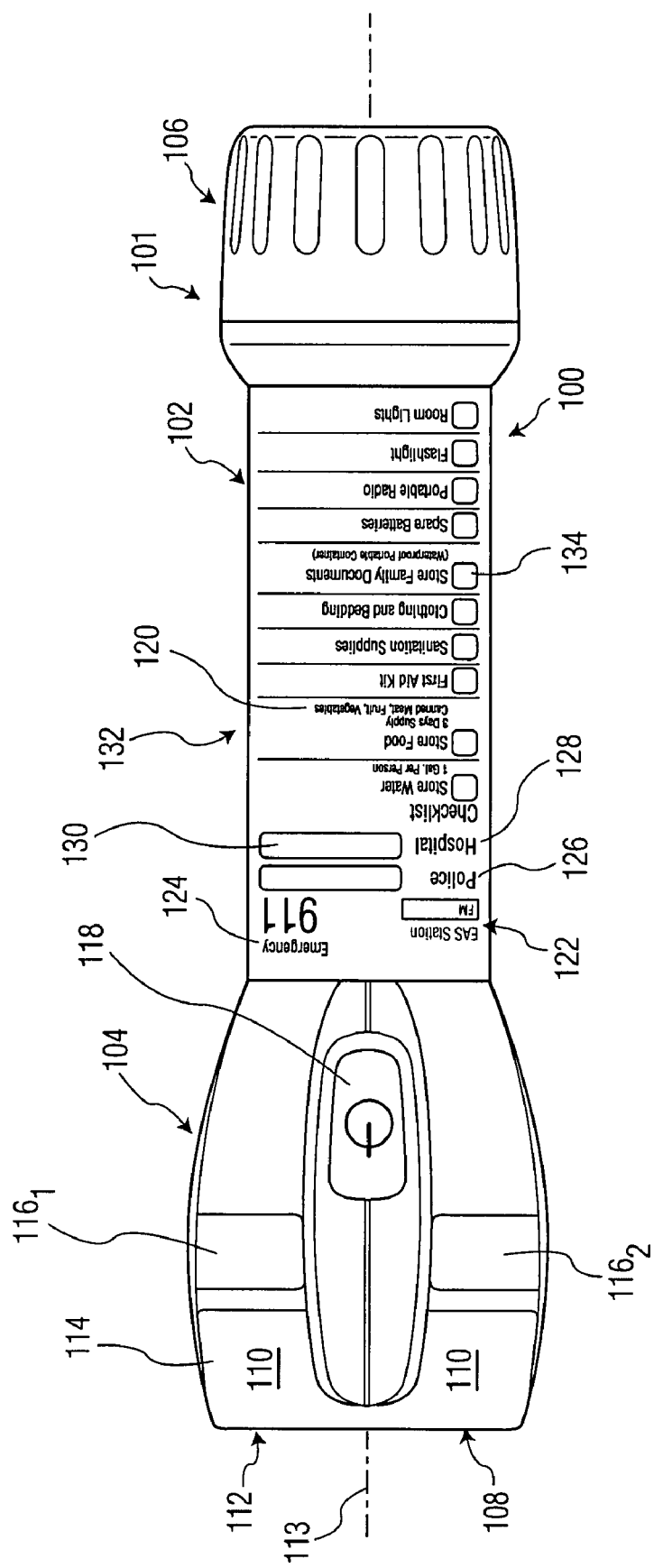
FIG. 1 is a top view of a flashlight.
Figure 2:
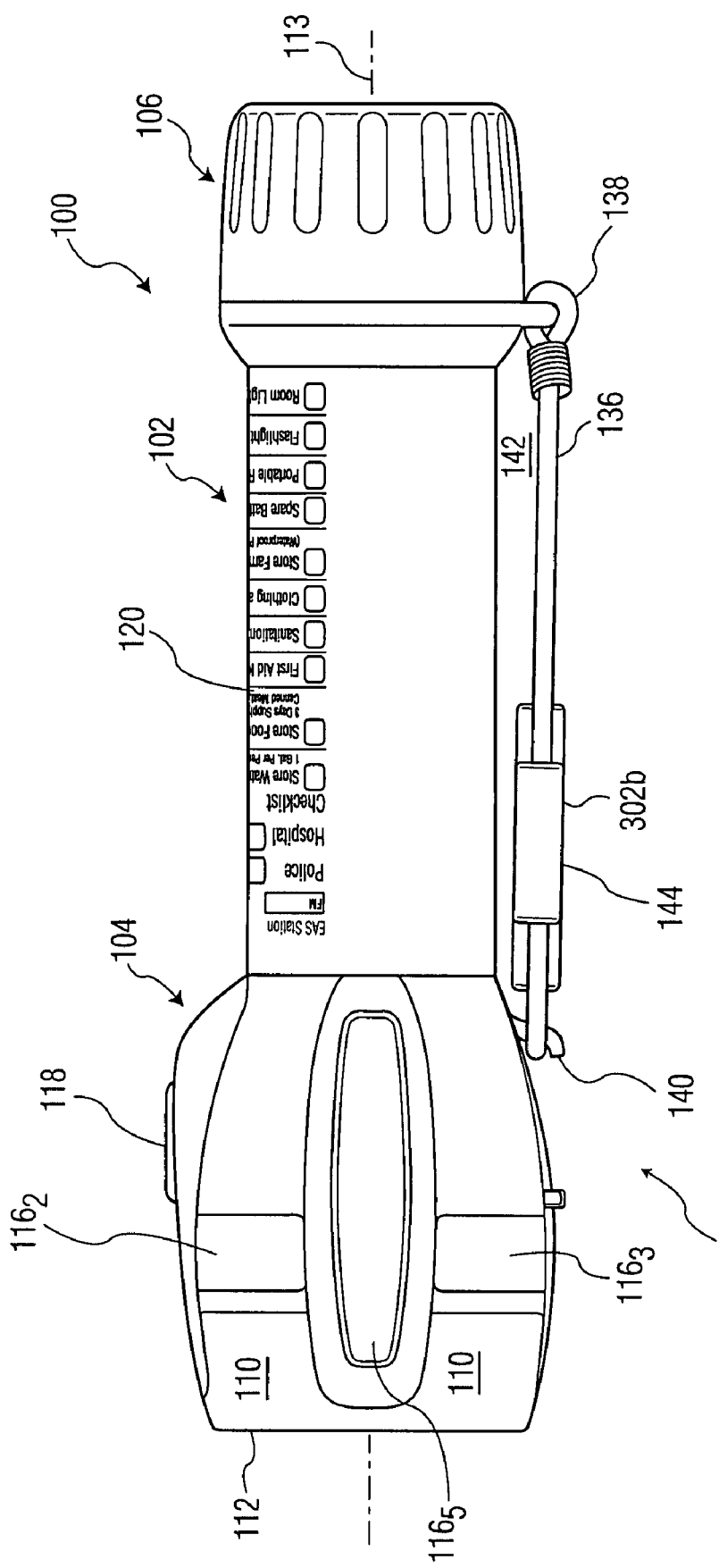
FIG. 2 is a left side view of a flashlight.

With reference to FIGS. 1 and 2, a flashlight 100 includes a body 101 having a generally cylindrical portion 102, a head 104, and a tail cap 106. As will be described in further detail below, the flashlight 100 includes a battery receiving region that is configured to selectively receive batteries having different sizes. In the illustrated embodiment, the flashlight 100 receives two (2) generally cylindrical C-size, AA-size, or AAA-size batteries. In another, the flashlight 100 receives two (2) AA-size or AAA-size batteries. Other numbers, sizes, and combinations of sizes are also contemplated, additional examples including CR123-size lithium and D-size batteries.

The head 104 includes a light source 108 such as one or more light emitting diodes (LEDs) or incandescent lamps, the number, configuration, and technology of which are ordinarily selected based on factors such as the desired brightness, battery life, and cost. A light management system includes a reflector (not visible in FIG. 1 or 2) and/or a substantially transparent lens or window 110. The window 110 includes a head end facing portion 112 that faces the head end of the flashlight 100 and a circumferential portion 114 that extends circumferentially around the head end of the flashlight 100. In the illustrated embodiment, the circumferential portion has a depth (i.e., a dimension in the flashlight longitudinal direction 113) of about 0.6 inches (15 millimeters).

The light source 108 and light management system cooperate to produce a conventional flashlight beam that it is emitted through the head end facing window portion 112 and hence generally along the longitudinal axis 113 of the flashlight 100. A portion of the light from the light source 108 is also emitted through the circumferential window portion 112 in the flashlight 100 radial direction. In the illustrated embodiment, the radially emitted light is thus visible from substantially any radial direction. Such a configuration tends to enhance the visibility of the flashlight and hence its user, especially in an emergency or other situation in which a third party is located to the side of the flashlight.

The head 104 also includes an outwardly facing reflector 116 that extends circumferentially about the head 104 and reflects light from an external source such as another flashlight, a searchlight, or the like. In one embodiment, the reflector 116 includes reflective strips $116_{1-4}$ formed from reflective tape and disposed in depressions molded or otherwise formed in the exterior of flashlight head 104. It will be understood that the reflector portion $116_4$, while not visible in FIG. 1 or 2, is substantially identical to reflector portions $116_{1-3}$. Additional reflectors such as longitudinally extending reflector portion $116_5$ may also be provided. In the illustrated embodiment, the reflector 116 is visible from substantially any radial direction. Such a configuration likewise tends to enhance the visibility of the flashlight and hence its user, even if the flashlight 100 is turned off. When the flashlight 100 is turned on, light reflected by the reflector 116 and the radially emitted light further enhance the visibility of the flashlight.

The flashlight 100 also includes a user operable pushbutton or other switch 118 that allows the user to operate the light source 108 as desired, for example by turning the light source 108 on or off.

The generally cylindrical body portion 102 carries a decal having text and/or graphics that provides emergency preparedness information 120 such as at least one of emergency contact information and an emergency preparedness checklist. In the illustrated embodiment, preparedness information is generally centered about the approximate angular position of the switch 118. Also as illustrated, the preparedness information includes emergency contact information such as the frequency of an emergency alert system (EAS) radio station 122, an emergency 911 phone number reminder 124, and phone numbers for the police 126 and hospital 128. The text serves as a prompt or cue that encourages the user to enter user-specific information, and the graphics delineates areas 130 in which the user can fill in the information, for example using an indelible marker. Also to the illustrated embodiment, the preparedness information also includes a checklist 132 calling out basic provisions such as water, food, a first aid kit, sanitation supplies, clothing and bedding, spare batteries, a portable radio, a flashlight, and room lights or extra light bulbs. The checklist text likewise serves as a prompt or cue for the user to check off the items in the delineated areas 134. Additional or different preparedness information may also be provided.

In another embodiment, the preparedness information may be silk screened, molded, or otherwise printed on the body portion 102. The body portion 102 may also include a substantially transparent outer sleeve. According to such an embodiment, the preparedness information is printed or otherwise provided on a card that is received in a recess or pocket located beneath the sleeve and accessed via the tail cap 106 or otherwise. Alternately or additionally, the recess may be used to store copies of particularly important identification information or other documents.

The tail cap 106, which threadedly attaches to the cylindrical body portion 102, allows the user to selectively access the battery receiving region and/or any storage recess, for example to insert or remove batteries or to insert or remove a preparedness card of other documents.

The flashlight 100 also includes a resilient, lanyard or cord 136 fabricated from a polymeric or other suitable material. As illustrated, the cord 136 is offset from the switch 118 and the preparedness information 120 by a radial angle (i.e., an angle about the flashlight longitudinal axis 113) by approximately 180 degrees. The tail end 138 of the cord 136 is secured by an eye located near the tail of the flashlight 100; a head end of the cord loops around a head end facing hook 140 and is thus selectively removable by the user. The cord 136, which may be maintained in tension when secured by the hook 140, is spaced radially from the body portion 102 so as to define a gap 142 that aids the user in gripping the flashlight 100. The cord 136 also carries an audible signaling device such as a whistle 144.

Figure 3A:
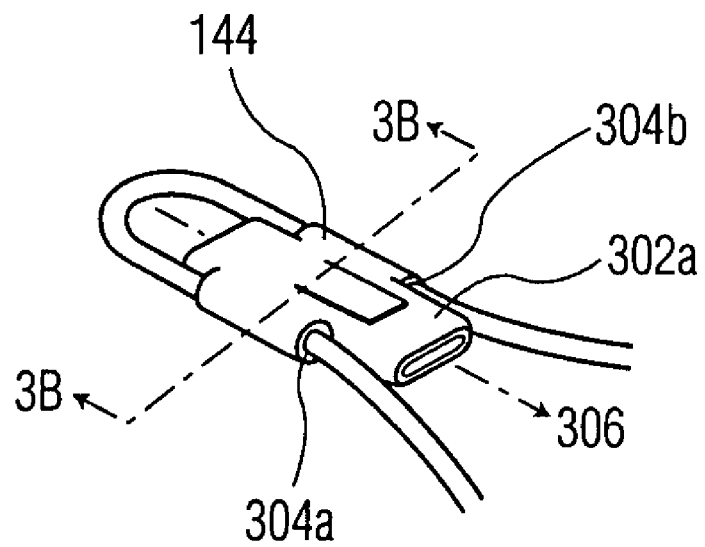
FIG. 3A depicts a cord and signaling device.
Figure 3B:
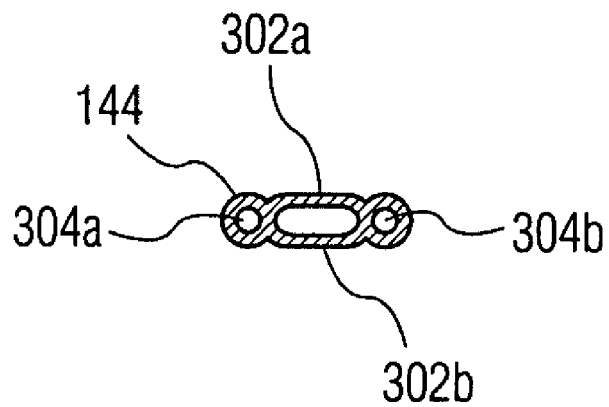
FIG. 3B is a cross-sectional view along the direction 3B-3B of FIG. 3A.

Turning now to FIGS. 3A and 3B, the whistle 144 is molded for otherwise fabricated from a polymeric material and takes the shape of a generally rectangular prism having first 302a and second 302b opposed major surfaces. The whistle 144 includes generally cylindrical holes or apertures 304a, 304b located along first and second sides of the whistle and extending along the longitudinal axis 306 of the whistle 144. The cord 136 is looped around and threaded through the apertures 304 so that, when the cord 136 is connected to the hook 140, the first major surface 302a faces the flashlight 100, the second major surface 302b faces away from the flashlight 100, and the whistle longitudinal axis 306 is substantially parallel with the flashlight longitudinal axis 113. The user accesses the whistle 144 by disengaging the cord 136 from hook 140 and blowing along the whistle longitudinal axis 306.

Figure 4:
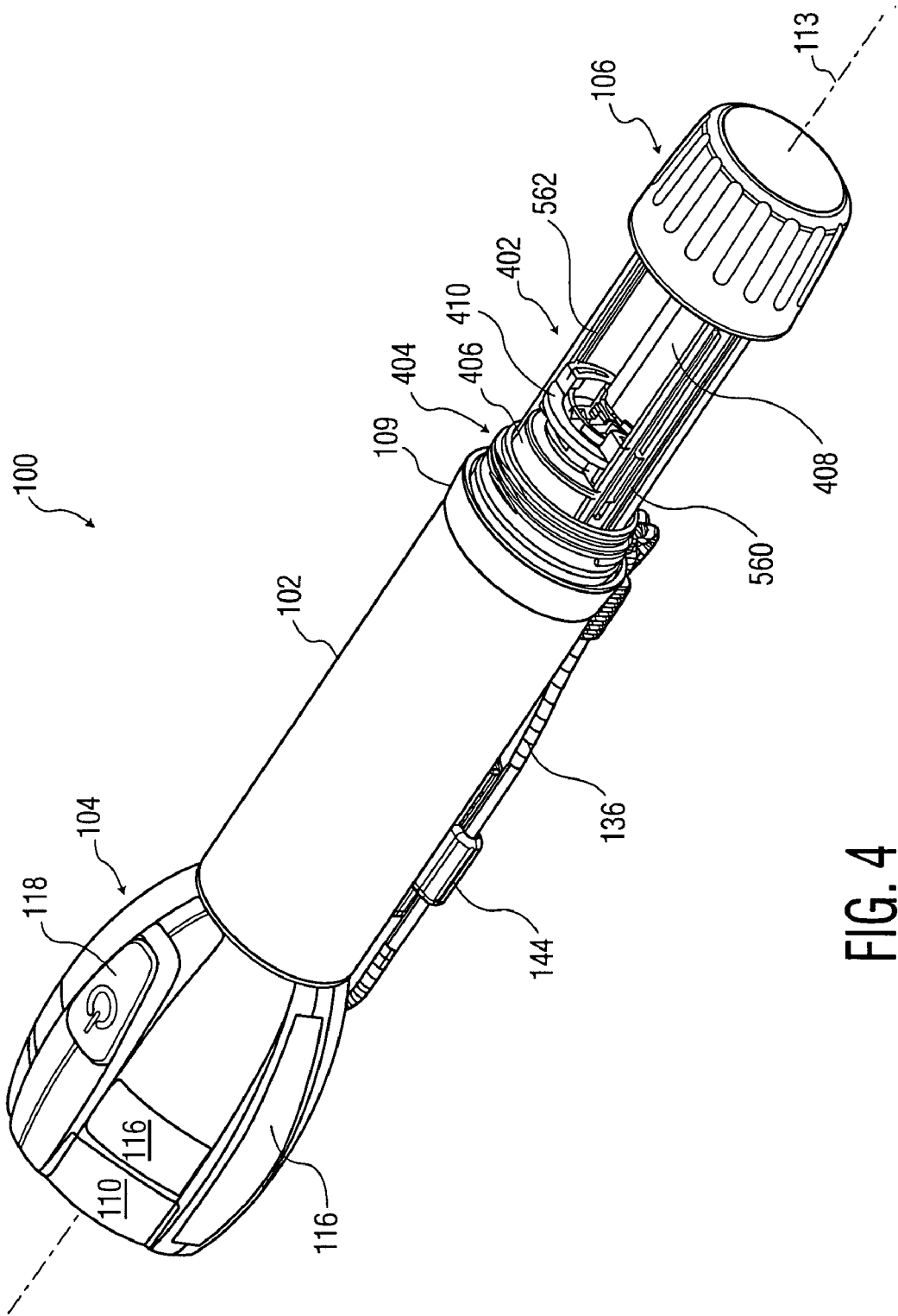
FIG. 4 is a perspective view of a flashlight.

With reference to FIG. 4, the flashlight 100 includes a trough-shaped battery tray 402 that receives first 406 and second 408 batteries in a battery receiving region having a longitudinal axis that is substantially parallel to the flashlight longitudinal axis 113. The battery tray 402 is attached to the interior of the flashlight housing for slidable motion in the direction of the flashlight longitudinal axis 113 to a closed or flashlight operating position and an open position in which the user can insert and/or remove the desired batteries 406, 408. The tail cap 106 is attached to the tail end of the battery tray 402 for rotational motion about the flashlight longitudinal axis 113 and threadedly attaches to threads 404 located at the tail of the flashlight body.

The batteries 406, 408 are received on either side of a middle battery contact holder 410 having a major plane that is substantially orthogonal to the flashlight longitudinal axis 113 and that longitudinally bisects or otherwise divides the battery receiving region. The middle contact holder 410 is attached to the battery tray 402 for slidable motion in the direction of the flashlight longitudinal axis 113, with its longitudinal position being adjustable by the user depending on the length of the batteries installed in the flashlight 100 and/or in connection with the installation of the batteries 406, 408.

As will be described in further detail below, the middle contact holder 410 carries electrical contacts that make electrical contact with the negative terminal of the first battery 406 and the positive terminal of the second battery 408. The middle contact holder 410 is configured to retain the batteries 406, 408 in their proper positions, for example by restraining the radial motion of the batteries 406, 408. Note that, as illustrated in FIG. 4, the first battery 406 is a C-size battery, while the second battery 408 is a AA-size battery. As will also be described in further detail below, the configuration of the middle contact holder 410 is such that the flashlight 100 will not operate if different sized batteries are simultaneously received in the battery tray 402.

Figure 5:
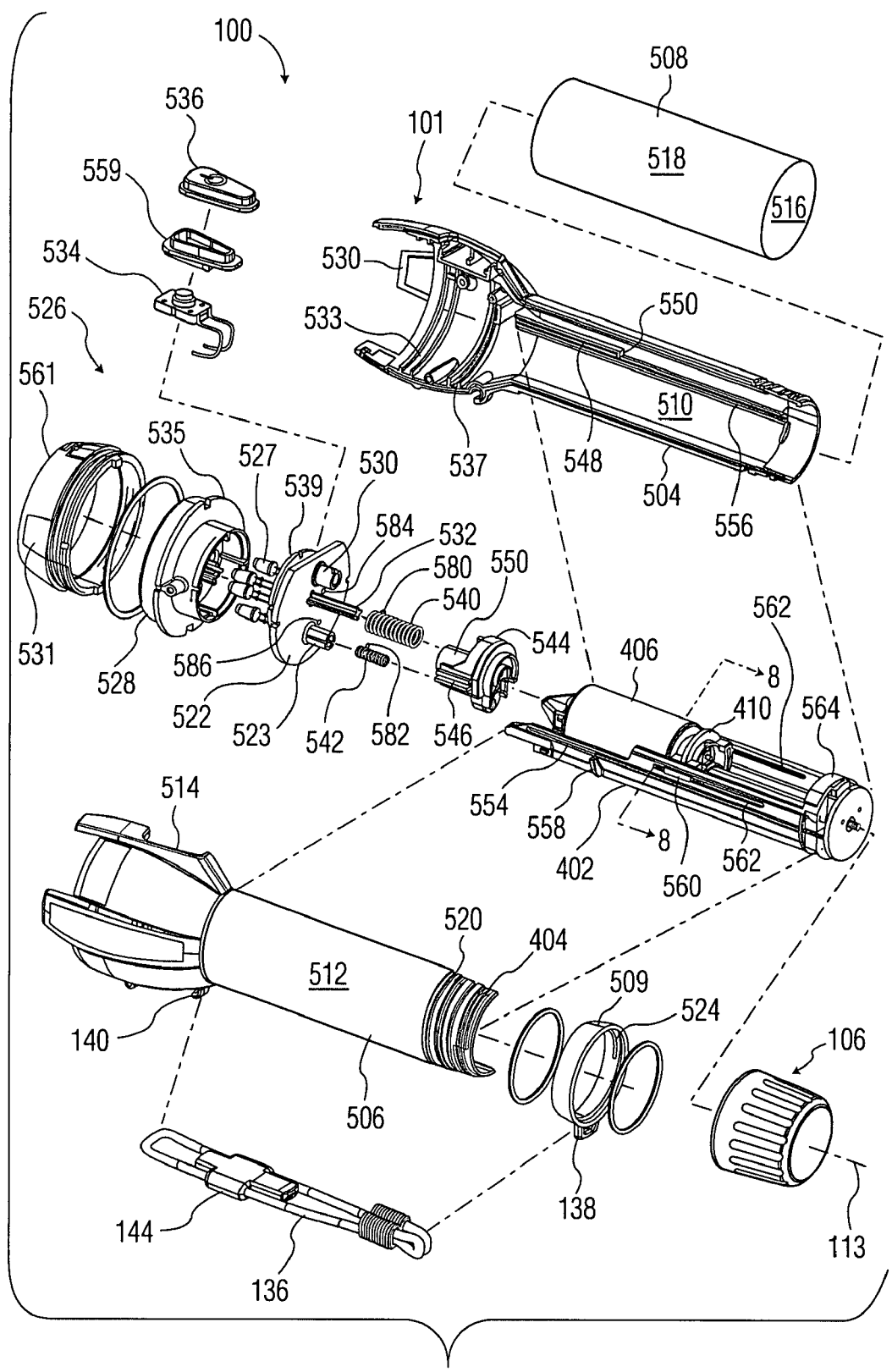
FIG. 5 is an exploded, perspective view of a flashlight.

Turning now to FIG. 5, the flashlight 100 includes a first housing shell 504, a second housing shell 506, a cylindrical sleeve 508, and a retainer ring 509. The first 504 and second 506 housing shells are substantially mirror images of each other and are configured to fit together to form generally cylindrical inner 510 and outer 512 surfaces having an upwardly facing switch opening 514. The outer surfaces of the housing shells 504, 506 include first 520 and second 404 threaded portions disposed at the tail thereof. The retainer ring 509 includes an inner surface that includes threads 524 configured to threadedly engage the first threads 520. Threads located on the interior of the tail cap 106 engage the second threads 404.

The sleeve 508, which in the case of a non-optically transparent embodiment can be drawn, molded, or otherwise formed from a metal such as aluminum, a polymer, or other suitable material, includes substantially cylindrical inner 516 and outer 518 surfaces. The inner surface 516 slides over the outer surface 506 formed by the housing shells 504, 506 from the tail end of the flashlight 100 prior to installation of the tail ring 509. While not illustrated in FIG. 4, it will be understood that the preparedness information 120 would be carried on the outer surface 518 of the sleeve 508, in a space or pocket formed between the outer 512 and inner 516 surfaces, or both. Note that, if desired, the user may replace the sleeve 508 by first removing the tail ring 509, for example where the user has moved and wishes to replace the sleeve 508 with a new sleeve 508 containing new contact phone numbers or other information.

The light management system 526, which in the illustrated embodiment is configured to receive four (4) LEDs 527 and includes a window 561 and a reflector 528, is located at the head of the flashlight 100. A plurality (four, in the illustrated embodiment) head end facing arms 530 formed at the head ends of the housing shells 504, 506 engage corresponding depressions 531 formed in the outer circumference of the window 561.

The interior of the housing shells 504, 506 includes a first circumferentially extending groove 533 that receives a corresponding flange 535 of the reflector 528. The housing shells 504, 506 include a second circumferentially extending groove 537 that receives a generally disk shaped switch holder 522. The switch holder 522 supports a user operable pushbutton or other switch 534 so that the switch 534 is operable through the switch opening 514. A flexible switch cover 536 and boot 559 provide a water resistant seal.

Located between the switch holder 522 and the reflector 528 is a printed circuit board (PCB) 539. Where, as illustrated, the light source includes LEDs 527, the PCB 539 includes a voltage converter circuit that boosts the relatively lower voltage produced by the batteries (e.g., about 3 volts direct current (VDC)) to the relatively higher voltage required by the LEDs 527 (e.g., approximately 4 VDC). The LEDs 527 and switch 534 are soldered or otherwise electrically connected to the PCB 539.

The switch holder 522 also includes an upper female post 530, a middle male post 532, and a lower female post 523 that extend longitudinally in the direction of the flashlight 100 tail. A first electrically conductive coil spring 540 fits over the male post 532; a second electrically conductive coil spring 542 is received by the lower female post 534. Loops 580, 582 formed at the head ends of the springs 540, 542 are captured by electrical feedthroughs such as respective rivets 584, 586 that pass through the body of the switch holder 522.

A head end contact holder 544 is attached to the interior of the flashlight housing for slidable motion in the direction of the flashlight longitudinal axis 113. As illustrated, the contact holder 544 includes longitudinally extending grooves or channels 546 that engage corresponding rails 548 formed in the inside of the housing shells 504, 506. Stops 550 limit the longitudinal travel of the contact holder 544. The contact holder 544 includes a middle female post 550 that extends longitudinally in the direction of the flashlight 100 head. The middle female post 550 aligns with and receives the middle male post 532 of the switch holder 522 and the first spring 540. The second spring 542 fits over a lower male post 552. Hence, the posts 532, 550 cooperate with the rails 548 and grooves 546 to maintain the alignment of the head end contact holder 544, while the springs 540, 542 urge the contact holder in the direction of the battery tray 402 and the flashlight 100 tail. Electrical contacts located on the head side of the contact holder 544 provide an electrical connection to the tail end of the springs 540, 542.

The battery tray 402 is also attached to the interior of the flashlight housing for slidable motion in the direction of the flashlight longitudinal axis 113. As illustrated, the battery tray 402 includes longitudinally extending rails 554 that engage corresponding grooves or channels 556 formed in the inside of the housing shells 504, 506. Stops 558 limit the longitudinal travel of the battery tray 402.

The middle contact holder 410 is attached to the battery tray 402 for slidable motion in the direction of the flashlight longitudinal axis 113. As illustrated, the middle contact holder 410 includes longitudinally extending rails 560 that snappingly engage corresponding grooves or channels 562 formed along the sides of the battery tray 402. Longitudinal motion of the middle contact holder 410 is limited by the longitudinal dimension of the channels 562.

A tail end contact holder 564 is fixedly mounted near the tail of the battery tray 402.

Figure 6A:
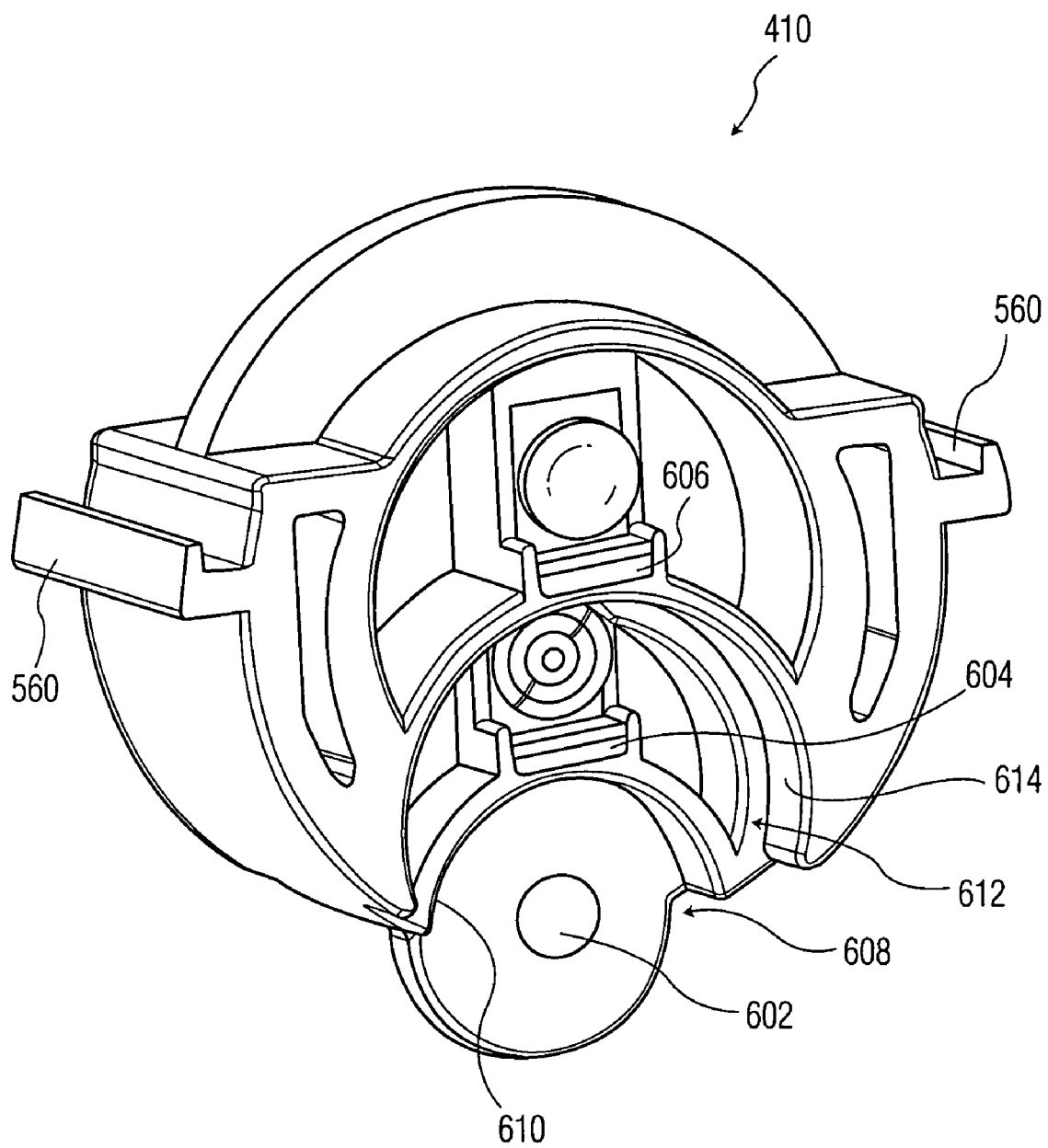
FIG. 6A is a top, tail end perspective view of a middle battery contact holder.
Figure 6B:
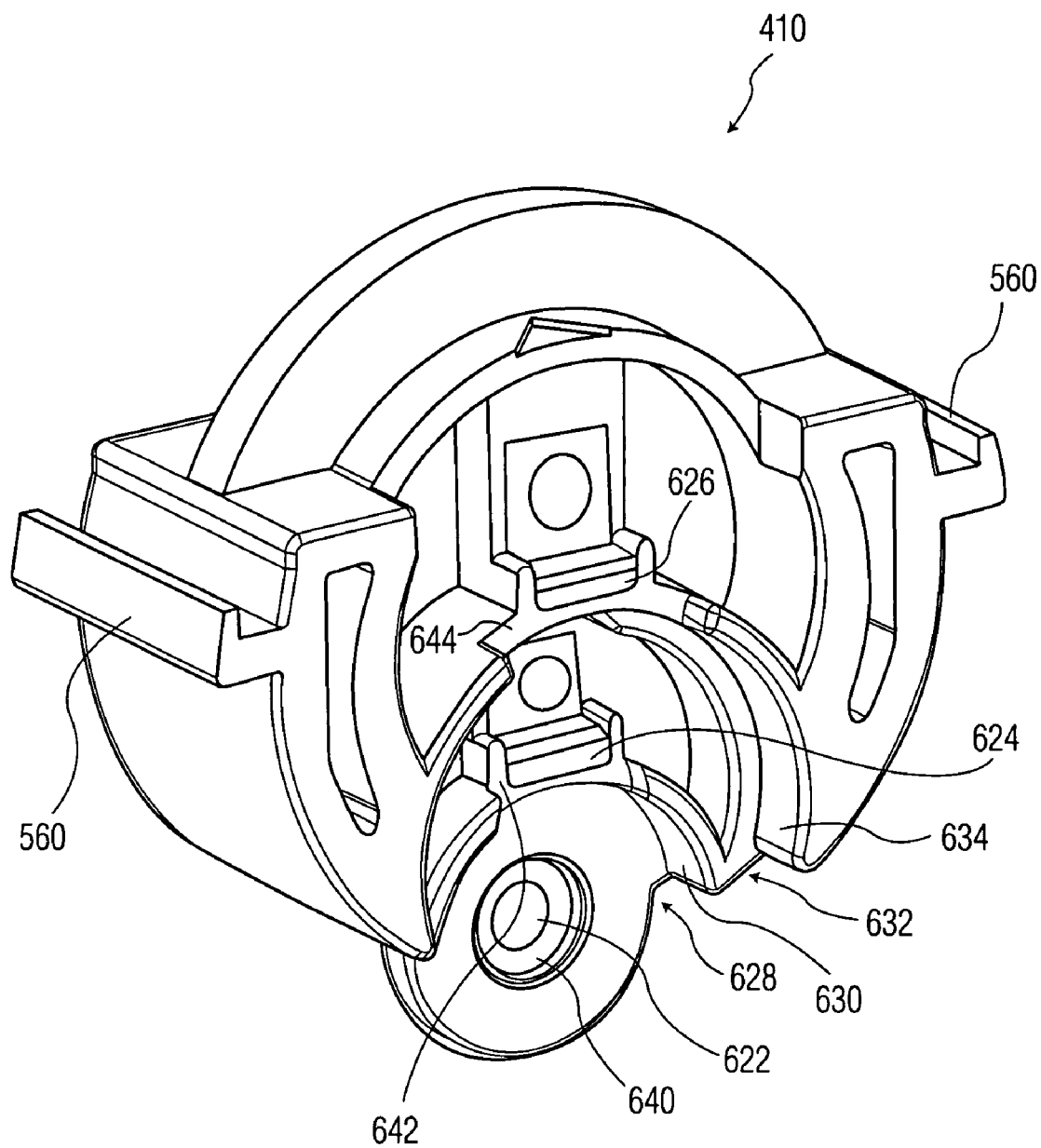
FIG. 6B is a top, head end perspective view of a middle battery contact holder.

The middle contact holder 410 will now be further described with respect to FIGS. 6A and 6B. Turning first to FIG. 6A, the head end facing side of the contact holder includes an AAA-size battery contact 602, an AA-size battery contact 604, and a C-size battery contact 606 that make electrical contact with the respective negative terminals of AAA, AA, and C size batteries received in the battery tray 402. Note that, in the illustrated embodiment, the contacts 602, 604, 606 are longitudinally offset. Thus, when the middle contact holder is received in the battery tray 402 the AAA-size battery contact 602 is located farthest from the head end of the flashlight 100, the C-size contact 606 is located nearest the head end, and the AA-size contact 604 located at an intermediate position.

The AAA size contact 602 is located in first recess 608 having a radial dimension greater than the radial dimension of an AAA-size battery but less than the radial dimension of an AA-size battery. More particularly to the illustrated embodiment, an arcuate shoulder 610 extends in the longitudinal direction toward the flashlight tail. Thus, when an AAA-size battery is received in the battery tray 402, its end is received in the recess 608 so that the shoulder 610 constrains the radial motion of the AAA-size battery.

The AA-size contact 604 is located in a second recess 612 having a radial dimension greater than the radial dimension of an AA-size battery but less than the radial dimension of a C-size battery. More particularly to the illustrated embodiment, an arcuate shoulder 614 extends in the longitudinal direction 113 toward the flashlight head. Thus, when an AA-size battery is received in the battery tray 402, its end is received in the recess 612 so that the shoulder 614 constrains the radial motion of the AA-size battery.

As illustrated, the inner surface 510 formed by the housing shells 504, 506 serves as a recess that constrains the radial motion of the C-size battery. In an alternate embodiment, a shoulder analogous to the shoulders 610, 614 but sized appropriately for a C-size battery may be provided.

Turning now to FIG. 6B, the tail end facing side of the middle contact holder 410 includes an AAA-size battery contact 622, an AA-size battery contact 624, and a C-size battery contact 626 that make electrical contact with the respective positive terminals of AAA, AA, and C size batteries received in the battery tray 402. In the illustrated embodiment, the contacts 622, 624, 626 are offset in the longitudinal direction. Thus, when the middle contact holder 410 is received in the battery tray 402, the AAA-size battery contact 622 is located farthest from the tail end of the flashlight 100, the C-size contact 626 is located nearest the tail end, and the AA-size contact 624 is located at an intermediate position.

The AAA size contact 622 is located in first recess 628 having a radial dimension greater than the radial dimension of an AAA-size battery but less than the radial dimension of an AA-size battery. More particularly to the illustrated embodiment, an arcuate shoulder 630 extends in the longitudinal direction 113 toward the flashlight tail. Thus, when an AAA-size battery is received in the battery tray 402, its end is received in the recess 628 so that the shoulder 630 constrains the radial motion of the AAA-size battery.

The AA-size contact 624 is located in a second recess 632 having a radial dimension greater than the radial dimension of an AA-size battery but less than the radial dimension of a C-size battery. More particularly to the illustrated embodiment, an arcuate shoulder 634 extends in the longitudinal direction 113 toward the flashlight tail. Thus, when an AA-size battery is received in the battery tray 402, its end is received in the recess 632. The shoulder 634 again constrains the radial motion of the AA-size battery.

As illustrated, the inner surface 510 formed by the housing shells 504, 506 serves as a recess that constrains the radial motion of the C-size battery. In an alternate embodiment, a shoulder analogous to the shoulders 630, 634 but sized appropriately for a C-size battery may be provided.

It should also be noted that the positive battery contacts 622, 624, 626 are further recessed in respective polarity protection recesses 640, 642, 644, the depths of which are greater than the length of the nubbin of a positive battery terminal. Hence, the recesses 640, 642, 644 provide polarity protection in case the battery 408 is inserted in the battery tray 402 with the incorrect polarity. In the illustrated embodiment, the polarity protection recess 642 is formed by a gap in the shoulder 630. The polarity protection recess 644 is likewise formed by a gap in the shoulder 634.

The AAA-size positive 622 and negative 602 contacts are electrically connected by way of feedthroughs such as rivets that extend through the body of the contact holder 410. The AA-size and C-size battery contacts are similarly connected. Note that, in the illustrated embodiment, the battery contacts for batteries of different sizes are not electrically connected at the middle contact holder 410 (e.g., there is no electrical connection between the AAA-size battery contacts and the AA-size battery contacts, and so on). The absence of such a connection prevents the completion of an electrical circuit and thus the operation of the flashlight 100 if batteries 406, 408 of different sizes are received concurrently in the battery tray 402, as operation in such a condition is generally considered undesirable.

Figure 7A:
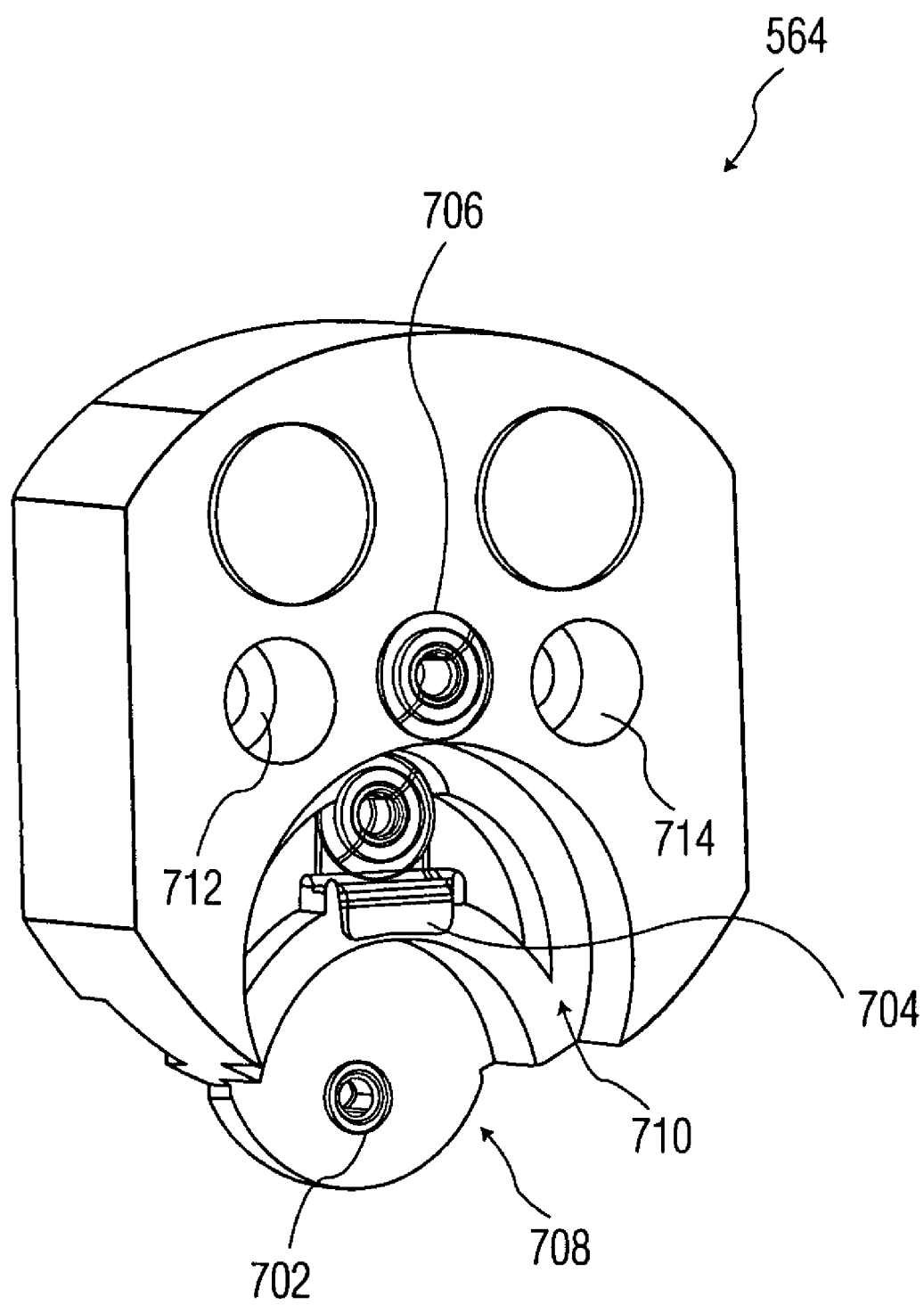
FIG. 7A depicts a tail end contact holder.

Turning now to FIG. 7A, the tail end contact holder 564 is configured similarly to the head end facing side of the middle contact holder 410, containing AAA-size, AA-size, and C-size battery contacts 702, 704, 706 and recesses 708, 710. Note the screw holes 712, 714 that accept screws (not shown) for fastening the tail end contact holder 564 to the battery tray 402. The battery contacts 702, 704, 706 are connected to the rear of the contact holder 564 by way of feedthroughs such as rivets that extend through the contact holder 564 body. A conductor such as a metal strip located at the rear of the contact holder 564 provides an electrical connection between the contacts 702, 704, 706.

Figure 7B:
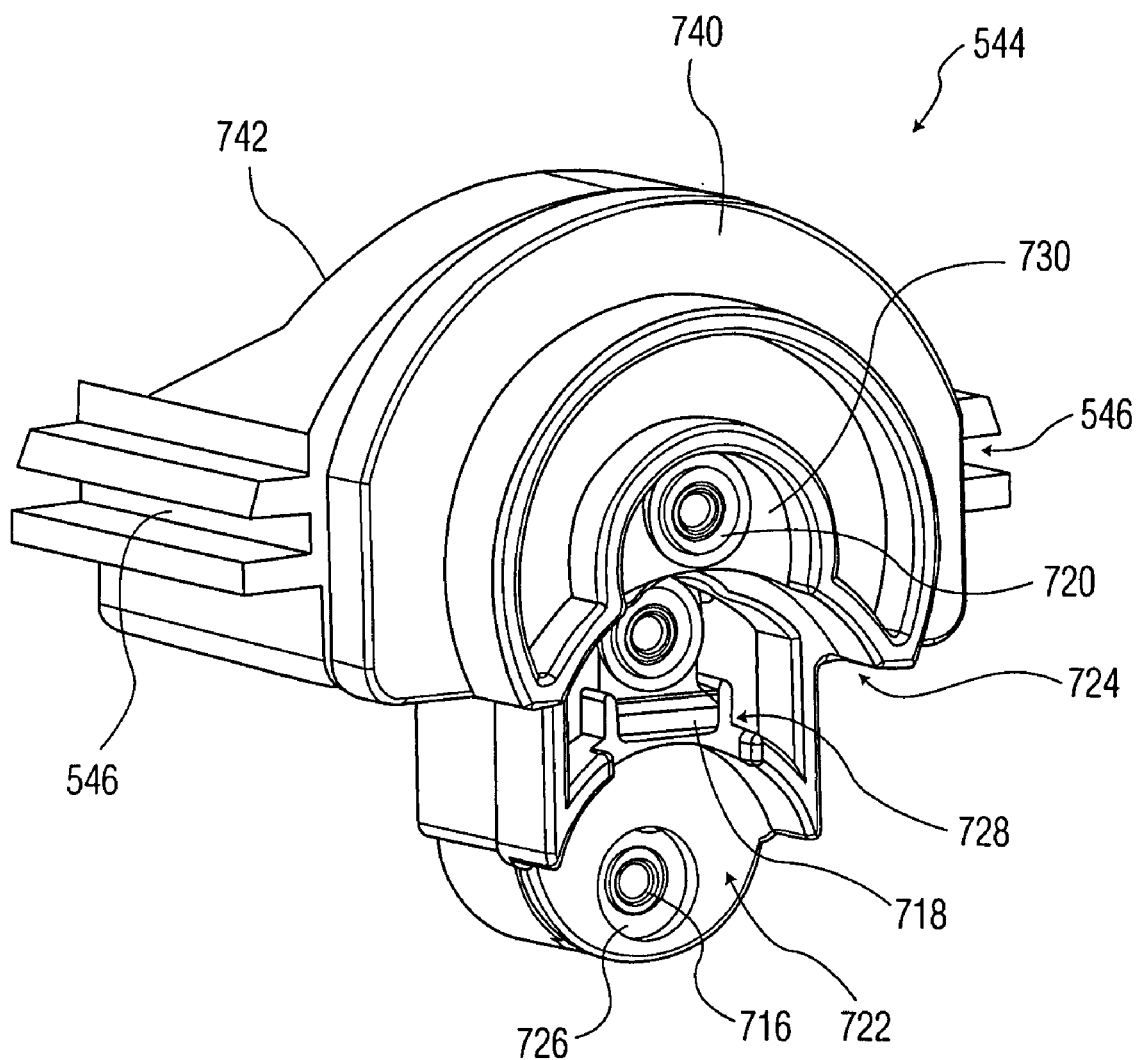
FIG. 7B depicts a head end contact holder.

Turning now to FIG. 7B, the head end contact holder 544 is configured similarly to the tail end facing side of the middle contact holder 410, containing AAA-size, AA-size, and C-size battery contacts 716, 718, 720, recesses 722, 724, and polarity protection recesses 726, 728, 730. The battery contacts 716, 718, 720 are connected to the rear of the contact holder 544 by way of feedthroughs such as rivets that extend through the contact holder 544 body. A conductor such as a metal strip located at the rear of the contact holder 544 provides an electrical connection between the contacts 716, 718, 720. Note that, for ease of manufacturing, the head end contact holder 544 may be fabricated as separate tail end 740 and head end 742 sections, which are subsequently fastened or otherwise joined.

Figure 8:
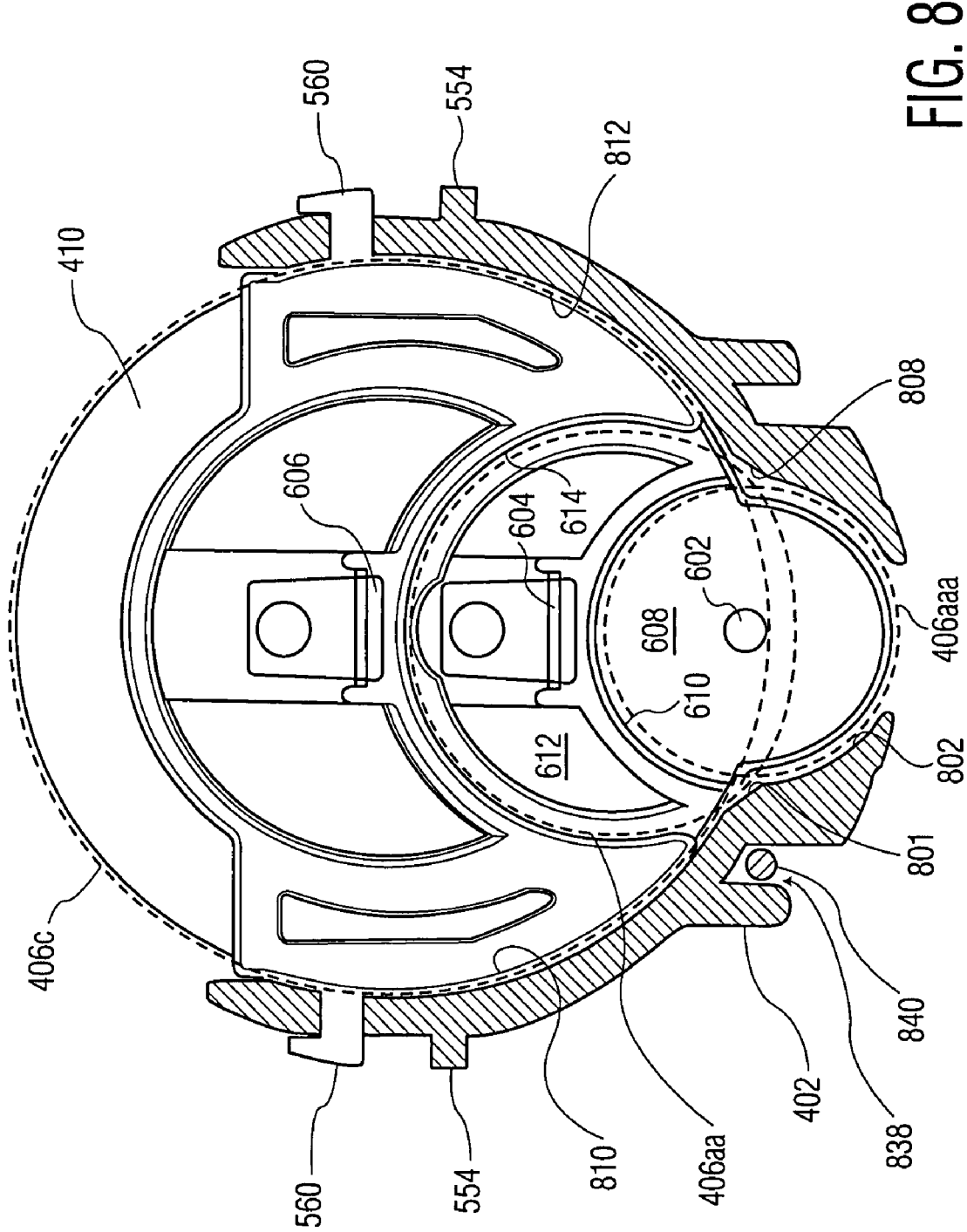
FIG. 8 is a partial cross sectional view at location 8-8 of FIG. 5.

FIG. 8 is a cross-sectional view showing the battery tray 402 and the middle contact holder 410, with the approximate position of an AAA-, AA-, and C-size battery 406 received in the battery tray 402 shown in phantom as $406_{aaa}$, $406_{aa}$, and $406_c$ respectively. As illustrated, the battery tray 402 includes an AAA-size battery support such as arcuate supports 802 that support the AAA-size battery $406_{AAA}$ in a relatively lower position, an AA-size battery support such as arcuate supports 808 that support the AA-size battery $406_{aa}$ in an intermediate position, and a C-size battery support such as arcuate supports 810, 812 that the support the C-size battery $406_c$ at a relatively higher position. It will be appreciated that the physical relationship between the various supports and the contact holders 544, 564 is similar.

Figure 9:
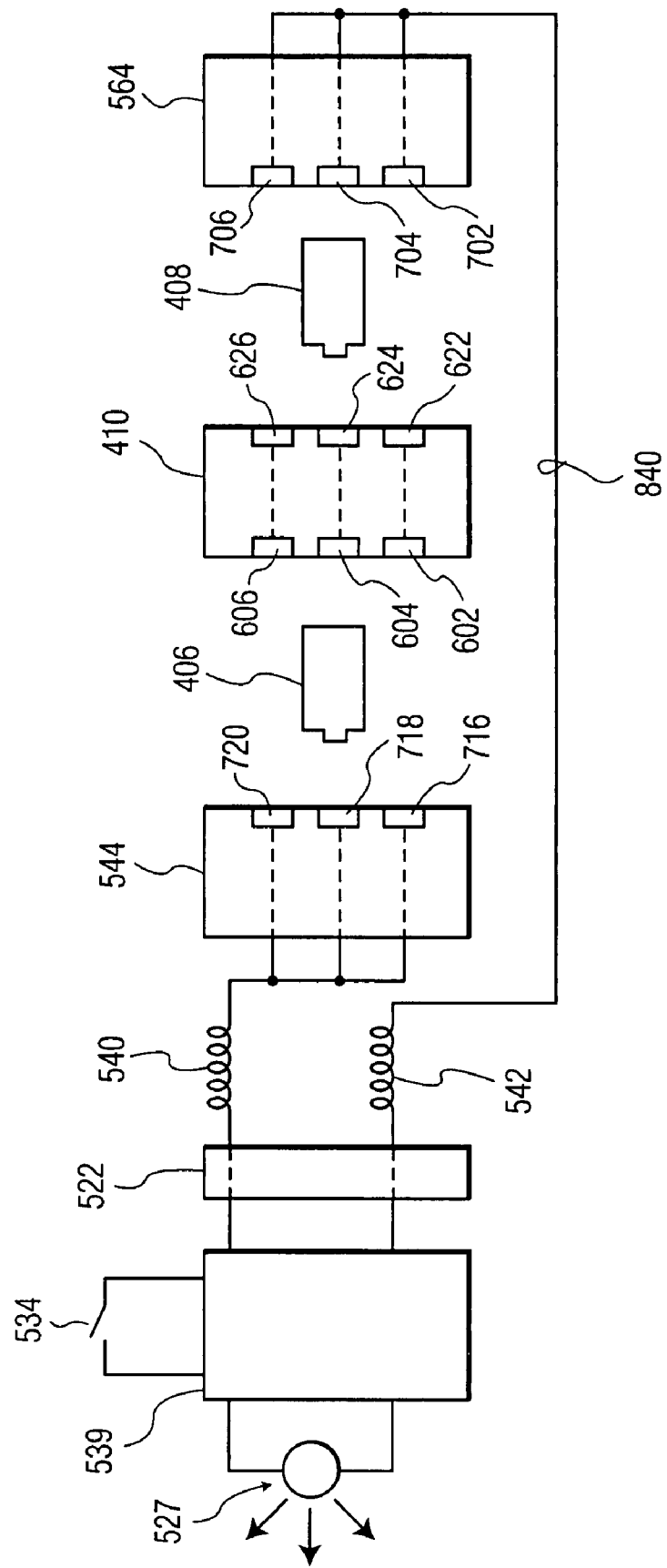
FIG. 9 is an electrical schematic of a flashlight.

An electrical schematic diagram of the flashlight 100 is shown in FIG. 9, with feedthroughs being illustrated as dashed lines. Note that the springs 540, 542 form a portion of the electrical circuit. An electrical conductor such as a wire 840 located in a longitudinal channel 838 formed in the underside of the battery tray 402 (see FIG. 8) provides an electrical connection between the head and tail ends of the battery tray 402.

The flashlight may also be constructed to be water resistant, for example by sealing the various joints with o-rings or other suitable seals, ultrasonic welding techniques, or the like.

Figure 10:
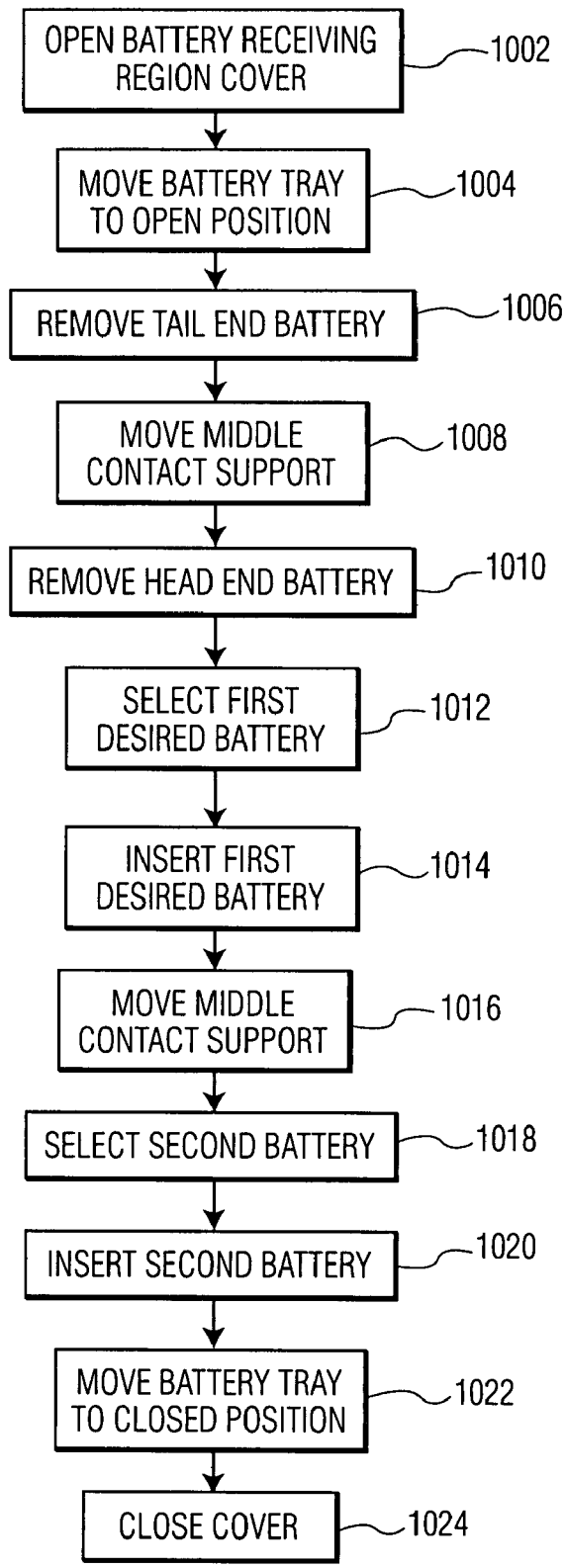
FIG. 10 depicts a method.

Removal and installation of batteries 406, 408 in the flashlight 100 will now be described with respect to FIG. 10.

At 1002, the user opens the battery receiving region cover. In the embodiment described above, for example, the user unscrews the tail cap 106.

At 1004, the user moves the battery tray 402 to an open position, for example by sliding it along the flashlight longitudinal axis 113 in the direction of the flashlight tail. The springs 540, 542 and head end contact support 544 tend to urge the batteries 406, 408 toward the tail end of the flashlight. When the head end support 544 reaches its stop 550, contact force is no longer applied to the batteries, thus aiding in the removal of the batteries.

At 1006, the tail end battery 408 is removed.

At 1008, the middle contact support 410 is moved toward the tail end of the flashlight to gain access to the head end battery 406, for example by grasping and pulling the contact support 410. Depending on the friction between the contact support 410 and battery tray 402, this may also be accomplished by tilting the tail end of the flashlight downward so that the weight of the battery 406 urges the contact support 410 downward.

The head end battery is removed at 1010.

A desired first battery is selected at 1012. In the case of a flashlight 100 configured to accept batteries having different sizes, the user may select a battery of a desired size.

At 1014, the desired first battery is inserted into the battery tray 402 to the head end side of the middle contact support 410 and urged toward the head end of the flashlight 100.

At 1016, the middle contact support 410 is moved toward the head end of the flashlight 100.

A desired second battery is selected at 1018 and inserted to the tail end side of the contact support 410 at 1020. Note that the head end of the second battery may be used to move the middle contact support 410 toward the head end of the flashlight 100.

At 1022, the battery tray is moved toward the closed or operating position. The head end of the battery 406 contacts the head end contact support 544. The force exerted by the springs 540, 542 urges the batteries 406, 408 toward the tail end of the flashlight 100 and provides the requisite contact force. The head and tail ends of the batteries 406, 408 are also received in their respective recesses, which restrain or limit battery radial motion.

The cover is closed at 1024.

Figure 11:
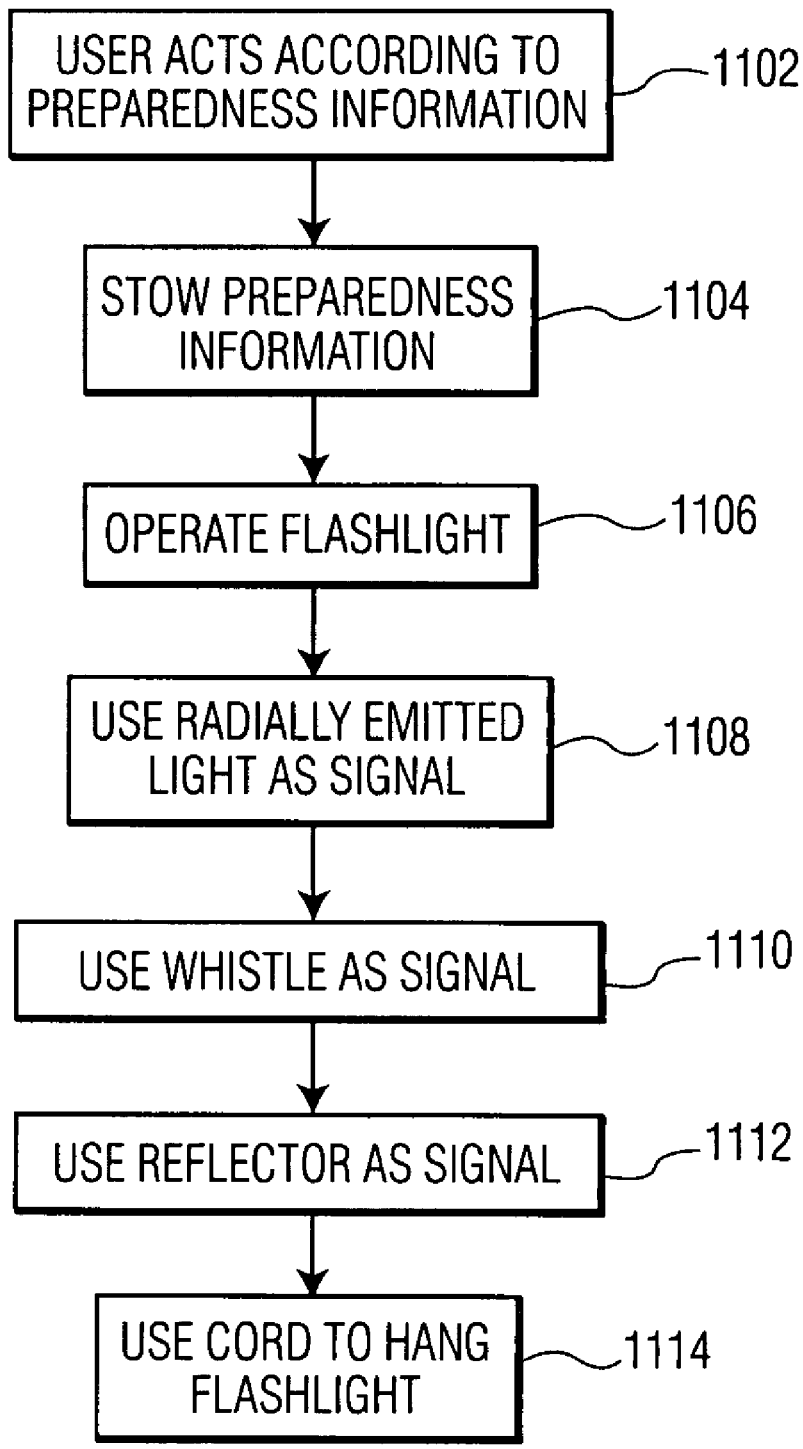
FIG. 11 depicts a method.

Use of the flashlight 100 will now be described with reference to FIG. 11.

At 1102, the user acts according to some or all of the preparedness information 120, for example by obtaining and filling in the contact information, obtaining the necessary provisions, completing the checklist, or the like.

Where the flashlight 100 includes a pocket for receiving the preparedness information 120, the information may be stowed in the pocket at step 1104.

The user operates the flashlight 100 at 1106. In the illustrated embodiment, the flashlight 100 emits a flashlight beam that can be used to perform a first illumination task function.

The light emitted in the flashlight 100 radial direction may be used concurrently as a signaling device or otherwise to provide a signaling function at 1108. For example, the user may be pointing the main flashlight beam in a first direction to accomplish a desired task, waving it, or the like. The radially emitted light may tend to attract the attention of a third party such as family or group member or a potential rescuer.

The user may also use the whistle 144 as an audible signaling device at step 1110.

The user may also use the reflector 116 as a signaling device at step 1112.

In this regard, it should be noted that some or all of the signaling functions may be performed concurrently. Thus, for example, the user may use the whistle 144 while the flashlight is turned on, thus using the flashlight to concurrently perform a task function, a visual signaling function, and an audible signaling function. The reflector 116 is also operational if the flashlight is turned off or the batteries 406, 408 are discharged.

At step 1114, the user may optionally detach the cord 136 from the hook 140 and hang the flashlight at a desired location.

Variations and alternatives are contemplated. As noted above, for example, the flashlight may be configured to accept differing numbers and sizes of batteries, in which case the contact supports 544, 410, 564, the battery tray 402 and other requisite components would be suitably reconfigured. Where the flashlight concurrently accepts three (3) or more batteries, additional middle contact supports 410 may also be provided.

The flashlight 100 may also be configured to include multiple circuits, depending for example on the size of the batteries received in the flashlight 100. According to such an implementation, an additional electrical path may be provided by way of an additional spring located at post 530 (see FIG. 5).

Other preparedness information 120 may also be provided. For example, the preparedness checklist may include a list of supplies typically required on a camping, hunting, fishing, boating, or other trip. In the case of a camping trip, for example, the checklist may include required licenses or permits and/or other camping gear. Analogous information may also be provided in the case of hunting, fishing, boating, or other trips. According to one implementation, several versions of the flashlight 100 may be produced, for example by selecting and installing the proper information at the time of assembly. Where the flashlight includes sleeve 120, for example, the sleeve may be produced in several versions, with the desired version selected as a function of the desired preparedness information.

The audible signaling device is not limited to a whistle and may include, for example, a horn, buzzer, beeper, siren, or other emergency or other signaling device, with devices that emit sounds ordinarily recognized as a distress signal being preferred.

Other configurations of the flashlight 100 housing are also contemplated. Moreover, the flashlight 100 may have other than a generally cylindrical form factor. Indeed, the device is not limited to a flashlight or radio and may be another battery powered device.

The invention has been described with reference to the preferred embodiments. Of course, modifications and alterations will occur to others upon reading and understanding the preceding description. It is intended that the invention be construed as including all such modifications and alterations insofar as they come within the scope of the appended claims.

What is claimed is:

1. A battery powered device comprising:
 a battery tray movable in a movement direction to an access position that provides access to the battery tray and to a device operating position;

a first battery contact support movably attached to the battery tray for movement in the movement direction and including opposed first and second sides;

a first side first battery contact that is located on the first side of the battery contact support and that makes electrical contact with a first terminal of a first battery received by the battery tray;

a second side first battery contact located on the second side of the battery contact support and that makes electrical contact with a first terminal of a second battery received by the battery tray;

a first support battery contact that makes electrical contact with a second terminal of the first battery;

a second support battery contact that makes electrical contact with a second terminal of the second battery.

2. The battery powered device of claim 1 wherein the first and second batteries are generally cylindrical and the device comprises a first side second battery contact located on the first side of the battery contact support, wherein the first side first battery contact located on the first side of the battery contact support makes electrical contact with the first terminal of the first battery on the first battery having of a first battery size and the first side second battery contact located on the first side of the battery contact support makes electrical contact with the first terminal of the first battery on the first battery having a second, different battery size;

a second side second battery contact located on the second side of the battery contact support, wherein the second side first battery contact located on the second side of the battery contact support makes electrical contact with the first terminal of the second battery on the second battery having the first battery size and the second side second battery contact located on the second side of the contact support makes electrical contact with the first terminal of the second battery on the second battery having the second, different battery size.

3. The battery powered device of claim 2 wherein the first side first battery contact located on the first side of the battery contact support is electrically connected to the second side first battery contact located on the second side of the contact support;

the first side second battery contact located on the first side of the battery contact support is electrically connected to the second side second battery contact located on the second side of the battery contact support.

4. The battery powered device of claim 3 wherein the first side first battery contact located on the first side of the battery contact support is not electrically connected to the first side second battery contact located on the first side of the battery contact support.

5. The battery powered device of claim 4 wherein the first support battery contact that makes electrical contact with the second terminal of the first battery makes electrical contact with the second terminal of the first battery on the first battery having the first battery size, the device comprises a third support battery contact that makes electrical contact with the second terminal of the first battery on the first battery having the second battery size, and wherein the first support battery contact and the third support battery contact.

6. The battery powered device of claim 2 wherein the battery powered device includes a housing, the battery contact support prevents a radial displacement on the first battery having the first size and an interior of the housing prevents a radial displacement on the first battery having the second size.

7. The battery powered device of claim 1 wherein the first terminal of the first battery is located at a first end of the first battery, the battery contact support includes a recess that receives the first end of the first battery, and the recess prevents a radial displacement of the first end.

8. The battery powered device of claim 1 wherein the first battery includes first and second ends and the device further comprises a second battery contact support that supports the battery contact that makes electrical contact with the second terminal of the first battery, wherein the first battery contact support prevents a radial displacement of a first end of the battery and the second battery contact support prevents a radial displacement of the second end of the first battery.

9. The battery powered device of claim 1 wherein the device includes a housing having a longitudinal axis and the battery tray is slidably attached to the housing for movement in the direction of the longitudinal axis.

10. The battery powered device of claim 9 wherein the first battery contact support is slidably attached to the battery tray for movement in the direction of the longitudinal axis.

11. The battery powered device of claim 9 wherein the housing is generally cylindrical and the device comprises a second battery contact support that supports the first battery contact that makes electrical contact with the second terminal of the first battery, wherein the second battery contact support is slidably attached to the housing for movement in the movement direction.

12. The battery powered device of claim 11 wherein the first support battery contact that makes electrical contact with the second terminal of the second battery is carried by the battery tray for movement therewith.

13. The battery powered device in claim 1 comprising a light source.

14. The battery powered device of claim 13 comprising
a housing;
a resilient cord including a first end that is selectively attachable to and detachable from the housing;
an audible signaling device attached to the resilient cord.

15. The battery powered device of claim 13 wherein the light source concurrently emits a light beam in a longitudinal direction and a signaling light in a radial direction.

16. The battery powered device of claim 13 comprising an emergency preparedness checklist.

17. The battery powered device of claim 13 comprising a housing, a cylindrical sleeve, and emergency preparedness information, wherein the sleeve is located over the housing and carries the emergency preparedness information.

18. The battery powered device of claim 13 comprising
the light source located at a head of the device;
a reflector that extends circumferentially about the head and reflects light from a light source external to the device.

19. A method of using a battery powered device including a battery tray and a battery contact support, wherein the battery tray receives a first battery of at least first and second battery sizes and a second battery of at least first and second battery sizes for powering the device, the method comprising:
placing a first battery in the battery tray, wherein the first battery is placed on a first side of the battery contact support;
moving the battery contact support toward the first battery;
placing a second battery in the battery tray, wherein the second battery is placed on a second side of the battery contact support;
using a first side first battery contact located on the first side of the contact support to make an electrical contact with a first terminal of the first battery;

using a second side second battery contact located on a the second side of the battery contact support to make an electrical contact with a first terminal of the second battery;

using a third battery contact to make an electrical contact with a second terminal of the first battery;

using a fourth battery contact to make an electrical contact with the second terminal of the second battery; and operating the device.

20. The method of claim 19 including sliding the battery tray to a closed position.

21. The method of claim 20 including closing a cover that is attached to the battery tray for movement therewith.

22. The method of claim 19 wherein moving includes sliding the battery contact support toward the third battery contact.

23. The method of claim 19 including using the battery contact support to prevent a radial displacement of the first and second batteries.

24. The method of claim 19 including the battery contact support to perform a battery polarity protection function.

25. The method of claim 19 wherein operating the device includes using a light beam emitted by the device in a first direction to perform a first task illumination function;

concurrently using light emitted by the device in a second direction to perform a third party visual signaling function.

26. The method of claim 19 wherein device includes a light source and an emergency sound source and operating the device includes using the light source to perform a task illumination function;

using the emergency sound source to perform a third party audible signaling function.

* * * * *